(12) United States Patent
Chen et al.

(10) Patent No.: US 7,327,365 B2
(45) Date of Patent: Feb. 5, 2008

(54) SHELL TEXTURE FUNCTIONS

(75) Inventors: Yanyun Chen, Beijing (CN); Xin Tong, Beijing (CN); Stephen S. Lin, Beijing (CN); Baining Guo, Bellevue, WA (US); Heung-Yeung Shum, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 10/898,435

(22) Filed: Jul. 23, 2004

(65) Prior Publication Data

US 2006/0028468 A1  Feb. 9, 2006

(51) Int. Cl.
*G06T 17/00* (2006.01)
(52) U.S. Cl. ...................... 345/426; 345/424
(58) Field of Classification Search ............... None
See application file for complete search history.

(56) References Cited

U.S. PATENT DOCUMENTS

| | | | | |
|---|---|---|---|---|
| 6,181,348 | B1 * | 1/2001 | Geiger | 345/583 |
| 7,133,041 | B2 * | 11/2006 | Kaufman et al. | 345/419 |
| 2003/0234784 | A1 * | 12/2003 | Grzeszczuk et al. | 345/426 |

OTHER PUBLICATIONS

Jensen et al., "A Practical Model for Subsurface Light Transport," Aug. 2001, pp. 511-514.*
Jensen et al., ("Efficient Simulation of Light Transport in Scenes With Participating Media Using Photon Maps," Jul. 1998, p. 1.*
Jensen et al., "A Rapid Hierarchical Rendering Technique for Translucent Materials", ACM Proceedings of SIGGRAPH 2002, pp. 576-581.
Chen et al., "Shell Texture Functions", Intl Conf on Computer Graphics and Interactive Techniques, ACM SIGGRAPH 2004 Papers, Aug. 2004,pp. 343-353.
Dorsey et al., "Modeling and Rendering of Weathered Stone", Proceedings of 26th Annual Conf on Computer Graphics and Interactive Techniques, Jul. 1999, pp. 225-234.
European Search Report for Application No. 05106589.4, dated May 7, 2007, 7 pgs.
Lengyel et al., "Real-Time Fur Over Arbitrary Surfaces", Proceedings of 2001 Symposium on Interactive 3D Graphics, Mar. 2001, pp. 227-232.
Tong et al., "Synthesis of Bidirectional Texture Functions on Arbitrary Surfaces", ACM Transactions on Graphics, vol. 21, No. 3, Jul. 2002, pp. 665-672.
Watt, "3D Computer Graphics", Addison-Wesley Publishing Co., 3rd Edition, 2000, pp. 173-179 and 275-305.

\* cited by examiner

*Primary Examiner*—Mark Zimmerman
*Assistant Examiner*—Andrew Yang
(74) *Attorney, Agent, or Firm*—Lee & Hayes, PLLC

(57) ABSTRACT

Techniques are provided for at least modeling any one of mesostructure shadowing, masking, interreflection and silhouettes on a surface, as well as subsurface scattering within a non-homogeneous volume. Such techniques include, at least, acquiring material parameters for a material sample, determining irradiance distribution values for the material sample, synthesizing the material sample onto a mesh of an object. The synthesized object may then be rendered by one of plural rendering techniques.

29 Claims, 9 Drawing Sheets

Shell Layer    Inner Core

• Sampling Point (Leaf Node)   ☐ Top Level Node

SHELL TEXTURE FUNCTIONS

FIELD

The present invention relates to techniques for determining a texture function for efficient and realistic modeling and rendering of objects composed of materials that exhibit variations in surface mesostructures, translucency and/or volumetric texture.

BACKGROUND

In the context of computer graphics, the generation of realistic looking virtual objects takes into account the interaction of light both on the surface of the object and in the volume of the object. Such interactions of light with the object are otherwise referred to as reflection and scattering, respectively. When accounted for, reflection and scattering produce visual effects such as shadowing, masking, interreflection, translucency and fine-scale silhouettes which elevate the realism of rendered images of the object. The interactions of light with the object are physically governed by the shape and material attributes of the object.

Previous attempts to map material attributes (e.g., color, surface normal perturbations, height field displacements, and volumetric geometry) onto surfaces to model fine-scale surface geometry, referred to as mesostructure, and its interaction with illumination, fail to take into consideration various appearance effects that arise from light transport within the material of the object. This deficiency is significant since many materials in the physical world are translucent to some degree. Thus, the appearance of the surface of an object may not be realistic.

On the other hand, further attempts to map material attributes onto surfaces that do account for translucency are beset by problems regarding the computational expense required. That is, detailed renderings of translucent objects by simulating radiance transfer through a participating medium require either an impractical amount of data storage or a significant amount of computation at rendering time.

SUMMARY

Shell texture functions are described herein.

In particular, techniques are provided for at least modeling any one of mesostructure shadowing, masking, interreflection and silhouettes on a surface, as well as subsurface scattering within a non-homogeneous volume. The techniques described herein include, at least, acquiring material parameters for a material sample, determining irradiance distribution values for the material sample, synthesizing the material sample onto a mesh of an object. The synthesized object may then be rendered by one of a number of rendering techniques.

BRIEF DESCRIPTION OF THE DRAWINGS

The detailed description is described with reference to the accompanying figures.

DETAILED DESCRIPTION

The following description describes techniques for modeling and rendering mesostructure shadowing, masking, interreflection and silhouettes on a surface, as well as subsurface scattering within a non-homogeneous volume. In particular, an object representation includes a volumetric shell layer and an inner core. The shell is created by texture synthesis using a volumetric material sample that may have mesostructures and material non-homogeneities; further, since material non-homogeneities from within the volume have a relatively subtle effect on appearance, the inner core may be modeled as a homogeneous material.

Figure 1:
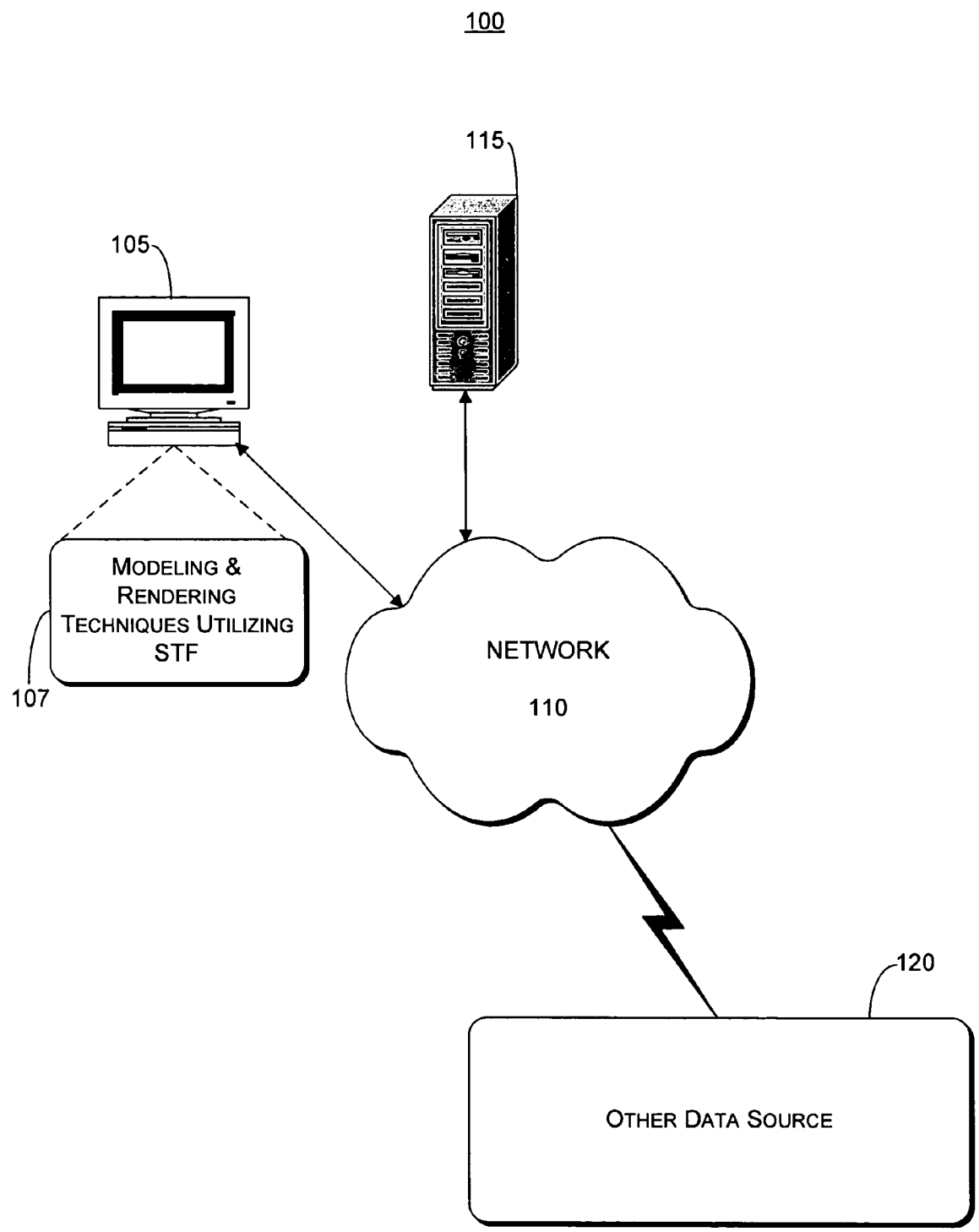
FIG. 1 shows a computing device for implementing computer graphic techniques utilizing example embodiments of texture functions as described herein.

FIG. 1 shows an example of computing device 105 having a processing component 107 to determine at least one shell texture function of a material sample of an object, and further rendering the object after forming an object shell of the object by texture synthesis of the material sample onto a mesh of the object.

Computing device 105 may be any of a variety of conventional computing devices such as a desktop personal computer (PC). Alternatively, computing device 105 may be a network-associated device including, but not limited to, a laptop computer, personal digital assistant (PDA), smartphone, etc., which may be in communication with network 110 by a wired and/or wireless link. An example embodiment of client device 105 is described in further detail with reference to FIG. 9.

Either of data sources 115 and 120 may be a server device that provides any of a variety of data and/or functionality to computing device 105. Data sources 115 and 120 may be a server device such as a network server or an application server. A network server is a server device that delivers content to computing device 105 by way of network 110. Such content may include web content coded in hypertext markup language (HTML), which may also contain JavaScript code or other commands. It is to be appreciated that either of data sources 115 and 120 may be used in other networks that are a part of The World Wide Web (e.g., where network 110 includes The Internet), as well as in other networks that are not part of The World Wide Web, such as an intranet.

To efficiently render a detailed object model on computing device 105 using technique 107, a texture function (hereafter referred to as "STF") of the object shell is described herein. STF represents the irradiance distribution of a shell voxel with respect to incident illumination direction. A shell voxel, as described herein, refers to a three-dimensional ("3-D") pixel volume near the surface of the shell of the object to be modeled and/or rendered. STF enables rapid determination of radiance for each voxel in a material sample volume of the object.

Figure 2A:
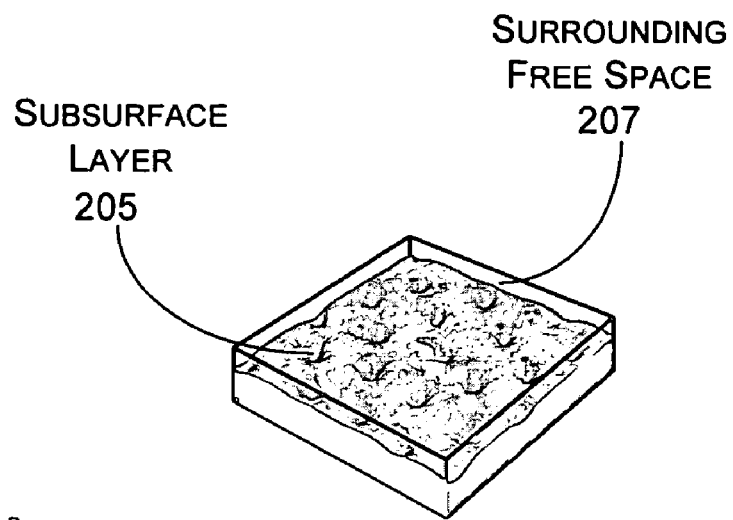
FIG. 2A shows a material sample, in accordance with an example embodiment, for which a STF may be computed.

FIG. 2A shows an example of material sample 200 for the purpose of contextualizing the discussion of STF. More specifically, STF is intended to represent irradiance distributions of points in material sample 200 for all incident illumination directions. Computationally, material sample 200 may be modeled in terms of an STF base volume $V_b$. STF base volume $V_b$ contains an $n_x \times n_y \times n_z$ array of voxels on a regular 3D grid, where $n_x \times n_y$ is used to compute the size of a parameter space of material sample 200, and $n_z$ defines the thickness of the STF. Values of n are typically predetermined. Mesostructure is represented in the STF base volume $V_b$, and therefore the voxels of $V_b$ may lie in either the subsurface layer 205 or the surrounding free space 207 of material sample 200.

In particular, for each subsurface voxel x of material sample 200, the following material properties are stored: extinction coefficient $\kappa(x)$, albedo $\alpha(x)$, which is a fraction of incident radiation that is reflected by the surface of material sample 200, and phase function $f(x, \omega_l, \omega)$, whereby $\omega$ and $\omega_l$ are the incoming and outgoing light directions, respectively. The scattering coefficient $\sigma_s$ of a material is related to extinction and albedo as $\sigma_s = \alpha \kappa$ and the absorption coefficient is defined as $\sigma_a = \kappa - \sigma_s$. The extinction coefficient $\kappa(x)$ and albedo $\alpha(x)$ describe the radiative transfer properties of a participating medium, which determine the translucency and chromatic properties of a voxel. A flag for indicating surface voxels is also included, and when the flag is on, a surface normal and relative index of refraction are typically predetermined as well.

STF is a 5D function that is defined by specifying a single-scattering component $I_s(x, \omega_l)$ and a multiple-scattering component $I_m(x, \omega_l)$, where x is representative of a current position in $V_b$ and $\omega_l$ is an incident light direction. The aforementioned STF values, single-scattering component $I_s(x, \omega_l)$ and a multiple-scattering component $I_m(x, \omega_l)$, allow rapid computation of the radiance $L(x, \omega)$ at any point x of $V_b$ and in any direction $\omega$. According to the light transport equation in a participating medium, the radiance $L(x, \omega)$ is expressed as:

$$(\omega \nabla)L(x,\omega) = \sigma_a(x)L_e(x,\omega) + \sigma_s(x)L_i(x,\omega) - \kappa(x)L(x,\omega)$$

$L_e(x, \omega)$ is the radiance from the object, and $L_i(x, \omega)$ is the in-scattered radiance, i.e., radiance scattered within the volume of the object. The radiance $L(x, \omega)$ may be evaluated using a known ray marching algorithm, of which the most computationally expensive calculation is the in-scattered radiance, which can be computed using volume photon mapping as:

$$L_i(x, \omega) = \frac{1}{\sigma_s(x)} \sum_{p=1}^{n} f(x, \omega_p, \omega) \frac{\Delta \Phi_p(x, \omega_p)}{\Delta V}$$

Specifically, the radiance is summed over the n photons inside a differential volume $\Delta V$ and $\Delta \Phi_p(x, \omega_p)$, is the flux carried by a photon from incoming direction $\omega_p$. The flux $\Delta \Phi_p(x, \omega_p)$ is divided into single-scattering and multiple-scattering terms because single scattering may be rendered by ray tracing, and multiple scattering through a homogeneous medium may be simulated using a dipole diffusion approximation. According to the example embodiments described herein, the dipole approximation may not be employed since the material sample is non-homogeneous, however the determinations leverage the property that multiple scattering may be considered to be substantially isotropic. For isotropic multiple scattering, the expression of $L_i(x, \omega)$ may be expressed as:

$$f(x, \omega_l, \omega) \frac{\sum_s \Delta \Phi_p(x, \omega_l)}{\sigma_s(x) \Delta V} + \frac{1}{4\pi} \frac{\sum_m \Delta \Phi_p(x, \omega_p)}{\sigma_s(x) \Delta V}$$

$\Sigma_s$ and $\Sigma_m$ are sums over single-scattering photons and multiple-scattering photons, respectively. A photon in $\Sigma_m$ is included in the above computation only if the photon is actually scattered. The incoming directions of single-scattering photons are considered to be the light direction $\omega_l$. Although multiple scattering is assumed to be isotropic, it is still a function of light direction $\omega_l$, because of surface mesostructures, which affects the direct illumination arriving at each surface point. The in-scattered radiance is expressed as:

$$L_i(x, \omega) = f(x, \omega_l, \omega) I_s(x, \omega_l) + \frac{1}{4\pi} I_m(x, \omega_l)$$

where $$I_s(x, \omega_l) = \frac{\sum_s \Delta \Phi_p(x, \omega_l)}{\sigma_s(x) \Delta V}, \quad I_m(x, \omega_l) = \frac{\sum_m \Delta \Phi_p(x, \omega_p)}{\sigma_s(x) \Delta V}$$

As stated previously, STF represents irradiance distributions of points in a material sample for all incident illumination directions. More particularly, single-scattering irradiance $I_s(x, \omega_l)$ and multiple-scattering irradiance $I_m(x, \omega_l)$ represent the voxel irradiance at x when the incident lighting comes from direction $\omega_l$. Thus, $I_s(x, \omega_l)$ and $I_m(x, \omega_l)$ may be pre-computed, i.e., prior to rendering, as the STF, which is a 5D function that can be easily stored. With the STF, in-scattered radiance $L_i(x, \omega_l)$ can be quickly calculated and the aforementioned equation $$(\omega \nabla)L(x,\omega) = \sigma_a(x)L_e(x,\omega) + \sigma_s(x)L_i(x,\omega) - \kappa(x)L(x,\omega)$$

may be integrated through the material sample to compute radiance $L(x, \omega)$.

In the computations of the present embodiment, the 5D STF subfunction is precomputed and stored prior to any rendering of a corresponding object. Although alternative embodiments could include the precomputation of the reflectance field of a material sample, consideration is given to the fact that the reflectance field is an 8D function of a 4D field of incident illumination and a 4D field of radiance, and therefore is rather expensive in terms of storage. On the other hand, by considering only directional lighting, illumination becomes a 2D function and the reflectance field reduces to a 6D function, but mesostructure geometry still needs to be known to accurately render silhouettes. Still, although precomputing a reflectance field for use with recorded mesostructure geometry may reduce run-time computation, the amount of additional data for the extra viewing dimensions, such data being densely sampled, can be significant.

On the other hand, the 5D STF combines naturally with volumetric mesostructures, while it is not clear how to combine a reflectance field with such (non-height-field) mesostructures. Because of these practical benefits of having a lower-dimensional texture function and since radiance from surface voxels can be calculated rather simply from irradiance data, voxel irradiances are precomputed in the present embodiment STF representation. Remaining computations, which are inexpensive in terms of computation, are then performed at run time.

To precompute the irradiance functions that compose the 5D STF according to the example embodiment, surface mesostructures and scattering characteristics within the STF base volume $V_b$ are first determined. Such determination is made by scanning material properties from real volumes and measuring mesostructures from real-world surfaces. From the base volume, the STF is constructed by calculating and storing the single-scattering and multiple-scattering irradiance of each voxel under sampled light directions, as described below.

Figure 2B:
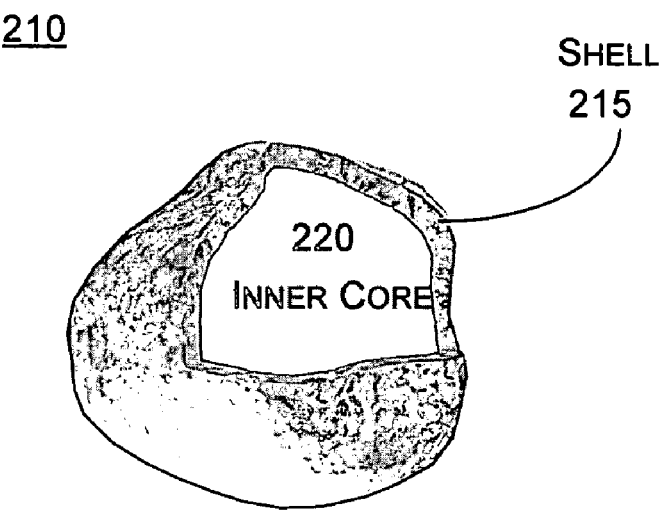
FIG. 2B shows a sample object to be modeled and rendered in accordance with the example embodiments of STF-related techniques described herein.

FIG. 2B shows a sample object 210 to be modeled and rendered in accordance with the example embodiments of STF-related techniques described herein. In particular, FIG. 2B shows object 210 comprised of two components, a heterogeneous shell layer 215 with mesostructures and a homogeneous inner core 220. When light is incident upon object 210, light from within inner core 220 of object 200 undergoes significant scattering such that a resulting radiance exhibits an averaging effect of the material properties of object 210. To take advantage of this characteristic, inner core 220 is modeled as a homogeneous material, according to an example embodiment, for which radiance can be rapidly computed. In contrast, voxels on shell layer 215 lie near the object surface, thus variations in material properties of shell layer 215 have a relatively large effect on the appearance of object 200.

Figure 3:
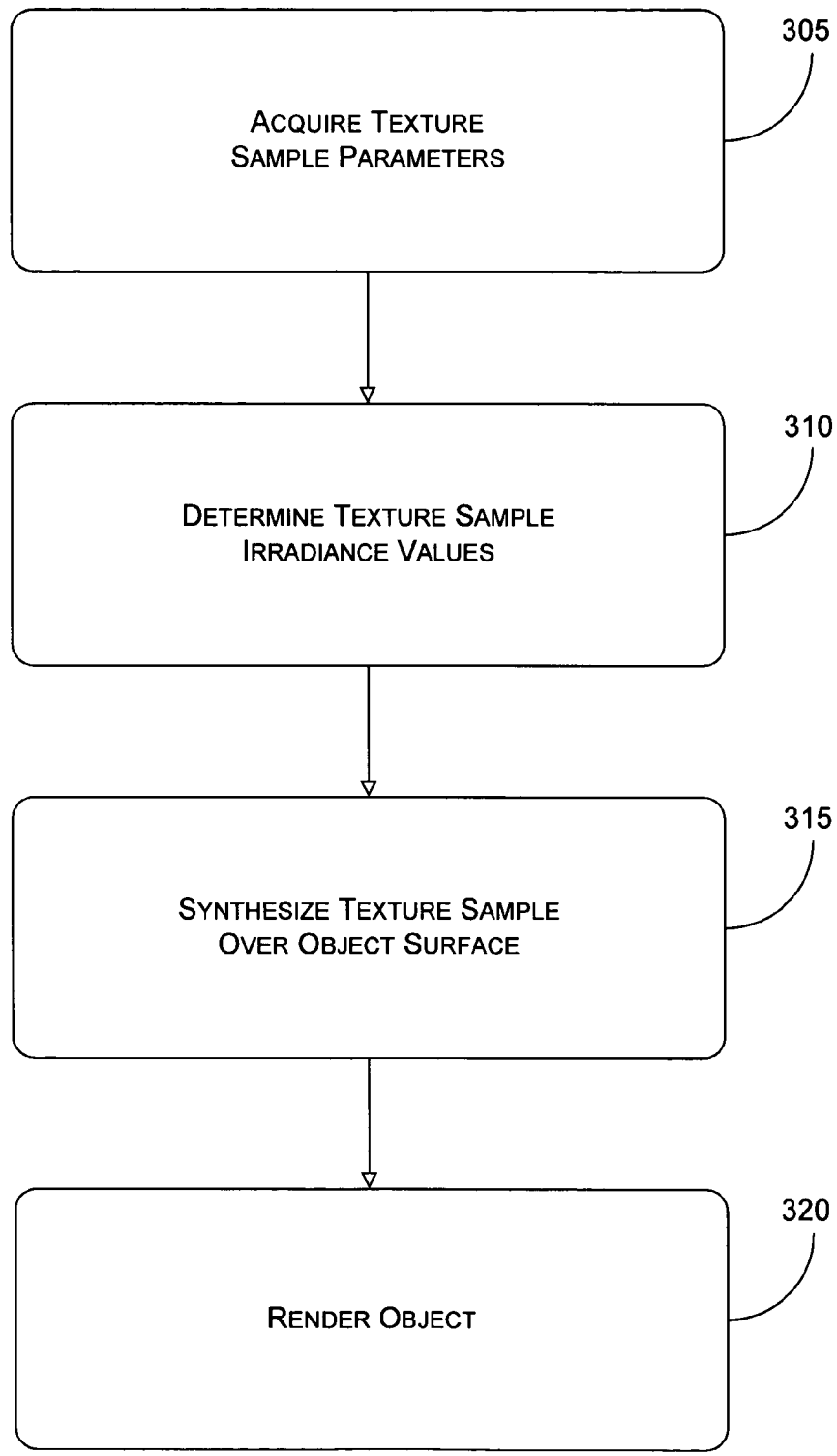
FIG. 3 is an example processing flow for modeling and rendering materials in accordance with example embodiments described herein.

FIG. 3 provides an overview 300 of modeling and rendering processing, with reference to object 200 of FIG. 2A. The processing of FIG. 3 takes into account the combination of mesostructures of the surface of shell 205 and non-homogeneities in inner core 220 that may result in complicated scattering of light within shell 215. In particular, processing overview 300, which will be described in further detail below, includes: block 305, which refers to at least one process or instruction to acquire texture sample parameters for, e.g., material sample 210; block 310, which refers to at least one process or instruction to determine an STF of material sample 210; block 315, which refers to at least one process or instruction to synthesize texture sample 210 over the surface of object 200; and block 320, which refers to at least one process or instruction to render object 200 utilizing at least the determined STF.

With regard to block 305, STF base volume $V_b$ is generated using volume modeling and processing techniques that are known for volume visualization. The example embodiment described herein may contemplate $V_b$ being obtained by measuring real materials using volume imaging technologies such as computed tomography (CT) or by scan-converting existing 3D geometry models.

More particularly, for measuring real materials using volume imaging technologies, $V_b$ may be determined using voxel classification followed by table lookups. Voxel classification is a standard process for determining which materials exist in each voxel of measured volume data. An alternative classification technique may be utilized to determine voxel materials in certain classes of volumes, and for each material its extinction coefficient κ and albedo α may be obtained in published measurement tables. Extinction coefficients and albedos of multiple materials in the same voxel are averaged according to their relative composition in the voxel. Voxels that lie on the mesostructure surface are identified as those that lie along the outermost isosurface. In the STF base volume $V_b$, a binary function is used to indicate voxels on the mesostructure surface.

Scan-converting an existing 3D geometry models consists of converting 3D geometry models into volume data. A 3D geometry model typically includes several components, each component being associated with a given material. When a geometric model is scan-converted, the conversion algorithm determines which material or materials exist in each voxel. As in the case of measured volume data, the voxel extinction coefficient κ and albedo α can be determined from tables.

Generally, published measurement tables provide only a single albedo α value, but for some materials such as veined marble, a spatially-varying albedo map α(x) may be required. To obtain an albedo map, voxel colors are generated for the object interior using solid texture synthesis, which may be executed on a procedural basis, a sample-based basis, or a sample-view-based basis. The procedural approach may be preferably implemented for limited types of textures; the sample-based approach may be preferably implemented for any solid texture in principle, although such approach may require a solid texture sample as input; and the sample-view-based approach may be preferably implemented for only a few (e.g., two or three) 2D images of the target solid texture and therefore may be easier to use. Voxel colors may then be converted to albedos α(x) by treating voxel colors as diffuse reflectance coefficients.

Scattering properties of the homogeneous inner core may be determined from properties of the core surface, according to the dipole diffusion approximation. According to the example embodiments described herein, core surface properties are substantially similar, if not the same, as those of the bottom layer of voxels in the shell.

Figure 4A:
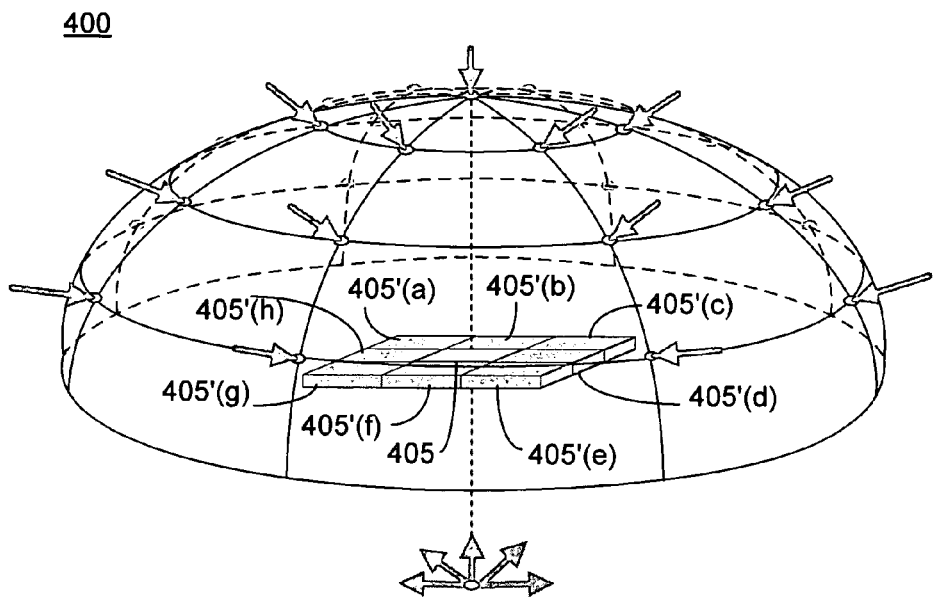
FIG. 4A shows an example embodiment of a STF base volume model sample.

FIG. 4A shows an example embodiment of a base volume model 400 to illustrate STF construction by photon mapping in a material sample, in accordance with block 310 of FIG. 3. In particular, the STF irradiance values for each voxel x of base volume $V_b$, shown as base volume 405, are computed using the material properties of base volume 405 for sampled illumination directions (depicted by the arrows in FIG. 4A). That is, for a sampled illumination direction $\omega_l$, single-scattering component $I_s(x, \omega_l)$ and multiple-scattering component $I_m(x, \omega_l)$ may be computed using at least one variant of known algorithms for photon tracing in a participating medium. An example of such algorithm is disclosed by Jenson & Christensen ("Efficient Simulation of Light Transport in Scenes with Participating Media Using Photon Maps" in *Proceedings of SIGGRAPH* 1998, pp. 311-320). According to the present embodiment, photons are emitted along a light direction $\omega_l$ and the contributions of the emitted photons to the STF as photons reflect off of the mesostructure surface and scatter within the object interior are then evaluated. From the mapped photons, the STF components of a voxel at x are evaluated in accordance with the equations $$I_s(x, \omega_l) = \frac{\sum_s \Delta\Phi_p(x, \omega_l)}{\sigma_s(x) \Delta V}, \quad I_m(x, \omega_l) = \frac{\sum_m \Delta\Phi_p(x, \omega_p)}{\sigma_s(x) \Delta V}$$

By the present embodiment, $\Delta V$ is chosen to be a sphere with a radius of one voxel.

To avoid boundary effects in STF sampling where photons exit the base volume out the sides, a base volume 405 may be surrounded by other identical volumes 405'(*a*)-(*h*) as shown in FIG. 4A. In the example embodiment of FIG. 4A, the base volume is surrounded by eight other identical volumes (405'(*a*)-(*h*)), but such number may vary in accordance with computational capabilities and corresponding expenses taken into consideration. In the example embodiment, base volume 405 may be rendered as a tile, and has texture dimensions $n_x$, $n_y$ that are greater than twice the diffuse mean free path of the STF base volume. Since base volume 405 may be non-homogeneous, the corresponding diffuse mean free path is computed as a weighted average among the materials that compose base volume 405. This constraint on base volume 405 dimensions ensures that the eight identical volumes 405'(*a*)-(*h*) around base volume 405 provide a sufficiently large volume neighborhood for computing the STF of each voxel in the STF base volume. The thickness $n_z$ of base volume 405 is set to be greater than the maximum mesostructure depth plus three times the average mean free path of base volume 405. This choice of $n_z$ ensures that the single-scattering contribution from the homogeneous inner core may be ignored. A non-tilable base volume of insufficient size may be converted to a larger tilable volume using constrained solid texture synthesis.

Figure 4B:
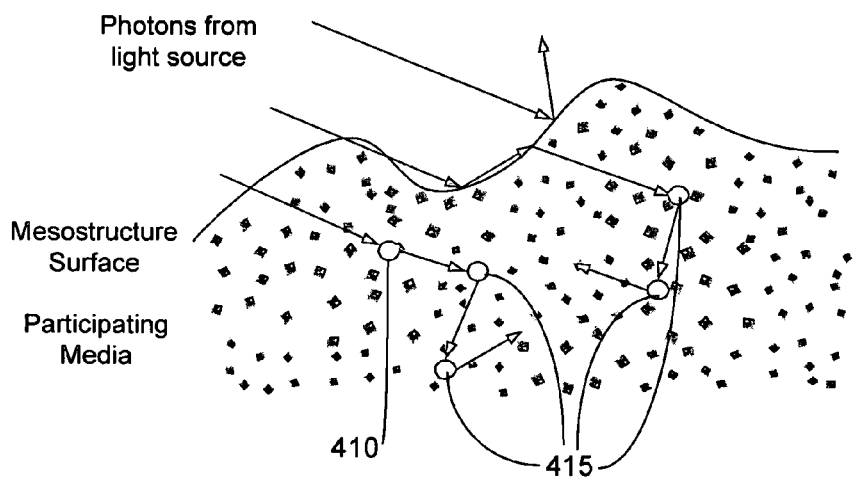
FIG. 4B shows a model illustrating lighting transport in a volumetric material in accordance with an example embodiment.

FIG. 4B shows a model illustrating photon tracing in base volume 405. According to the example of FIG. 4B, a photon interacts with the mesostructure surface where the photon is either reflected at the surface or refracted into the object interior, according to formulae for unpolarized light that are known in the art. Photons that reflect off a surface point are not recorded because these interactions are handled by ray tracing during the rendering stage. A photon that propagates through the object interior may either pass through the medium unaffected or interact with the medium. When the photon interacts with the medium at a voxel x, the contribution of the interaction is added to the single scattering component $I_s(x, \omega_l)$ if it is the photon's first interaction with the medium, such as at point 410, or to the multiple-scattering component $I_m(x, \omega_l)$ otherwise, such as at any of points 415, where surface reflection is considered an interaction. The probability that the photon interacts with the medium at position x is determined by the following cumulative probability density function $$p(x) = 1 - e^{-\int_{x_0}^{x} \kappa(\xi) d\xi}$$

where $x_0$ is a mesostructure surface point where the photon refracted into the object interior. The integral in the equation is evaluated by a ray marching method. If a photon interacts with the medium, a random graphics process may decide whether the photon is scattered or absorbed according to a scattering probability based on the albedo $\alpha(x)$. The direction of the scattered photon is calculated by importance sampling of the phase function $f(x, \omega', \omega)$.

Photon tracing is performed for a set of discretized light directions which sample the upper and lower hemispheres of the object. For each light direction $\omega_l$, a large number of photons are traced, and the contributions of the photons to the STF are added to $I_s(x, \omega_l)$ and $I_m(x, \omega_l)$. For instance, an example embodiment may include 1000 photons being traced for each RGB channel. The upper hemisphere may then be sampled by 72=6×12 light directions. The lower hemisphere may be sampled identically, thus the incident light may be considered to be isotropic multiple scattering because backlighting arrives from the homogeneous inner core. Based on this property, the multiple-scattering STF values of all directions in the lower hemisphere are averaged and recorded as $I_m(x, \omega_b)$ where $\omega_b$ represents all backlight directions.

Accordingly, moderate amounts of storage are needed for the STF, thus reducing associated computational expenses. For example, a material sample having a 96×96×10 base volume may be sampled under 73 light direction, would occupy 205 MB of storage space before compression. For compression, schemes utilizing vector quantization (VQ) are employed followed by entropy coding, where each VQ codeword is a 6D vector of the single- and multiple-scattering irradiance colors for a given voxel and lighting direction. For an STF, such scheme may yield a compression ratio of 48:1.

FIGS. 5A-5D are provided to illustrate the synthesis of a material shell from STF base volume $V_b$ (shown as 405 in FIG. 4A) of a material sample, in accordance with block 315 of FIG. 3.

More particularly, to form the shell model, the base volume $V_b$ is synthesized onto a target mesh of an object, such that each point in the shell is assigned a texture coordinate in the base volume $V_b$. Each shell voxel is then assigned the STF values of the base volume voxel with which it is associated.

Figure 5A:
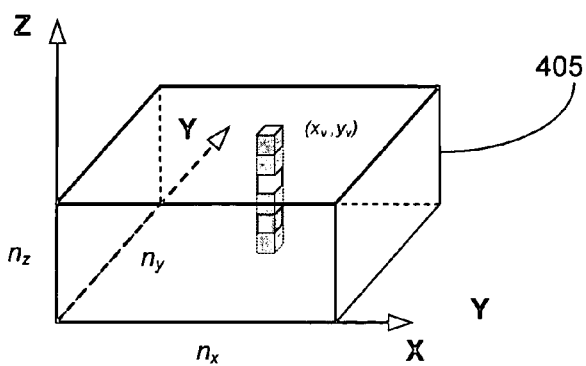
FIG. 5A-5D illustrates perspectives of the synthesis of a material shell (the subsurface layer) onto an object, in accordance with an example embodiment.

FIG. 5A shows the material shell of the $n_x \times n_y \times n_z$ base volume 405 of the material sample. For this synthesis, the base volume $V_b$ 405 may be regarded as a 2D texture T(x, y) of $n_x \times n_y$ texels. Each texel $T(x_1, y_1)$ consists of a stack of $n_z$ voxels $\{(x_i, y_j, z_1), \ldots, (x_i, y_j, z_{nz})\}$ with their material properties. The texture T(x, y) is synthesized onto the target surface mesh using a known algorithm, such as that proposed in the co-pending patent application, U.S. Ser. No. 10/299,623 (filed on Nov. 19, 2002) by Tong et al. (hereafter referred to as "Tong"), which is incorporated herein by reference.

Figure 5B:
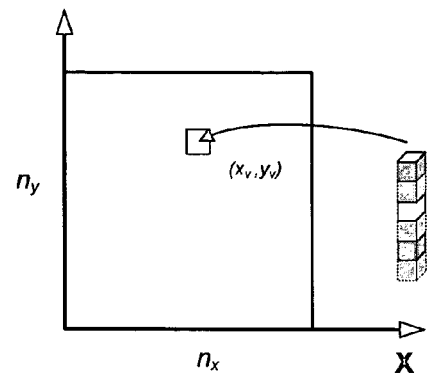

FIG. 5B illustrates the 2D textures in which texels are high-dimensional vectors to illustrate the technique for synthesizing color textures on surfaces described by Tong. This method is based on the observation that at a local scale, a given high-dimensional texture sample contains only a small number of perceptually distinguishable mesostructures and reflectance variations, known as textons. The textons of a high-dimensional texture function are determined through a texton analysis or a K-means clustering step, and are then encoded in a 2D texton map that captures the essence of the texture in a compact representation. Synthesis of this 2D texton map onto the target mesh effectively determines a mapping of the high-dimensional texture. The computational cost is similar to that of color texture synthesis and can be accelerated using the k-coherence search technique.

For base volume 405 in FIG. 5A, synthesis is based on the following voxel properties: extinction coefficient $\kappa$, albedo $\alpha$, and phase function $f(x, \omega', \omega)$. Since phase functions are a function of $\omega'$ and $\omega$, it may be assumed that $f(x, \omega',$ ω)=ƒ(x, ω'∘ω), i.e., ƒ depends only on x and the phase angle ω'∘ω. Under this assumption, the similarity of two phase functions ƒ(x, ω'∘ω) and ƒ(x', ω'∘ω) may be measured by densely sampling the phase angles at points x and x'. For further simplification, a moment similarity relation may be employed that allows the scattering properties of the medium to be altered without significantly affecting the light distribution. With this, the scattering coefficient σ$_s$(x) may be reduced to $$\sigma'_s(x) = \sigma_s(x)\left(1 - \int_{4\pi} f(x, \omega\cdot\omega')(\omega\cdot\omega')d\omega'\right).$$

This moments similarity relation is an effective approximation when light scattering is strongly-peaked forward scattering, which is likely the case for most translucent materials of interest in computer graphics. With the above simplifications, synthesis of the material shell is performed using the reduced extinction coefficient κ'(x)=σ'$_s$(x)+σ$_a$(x) and albedo α'(x)=σ'$_s$(x)/κ'(x). The scattering coefficient is reduced only for texture synthesis purposes, and the original scattering coefficient is used to compute the STF.

Figure 5C:
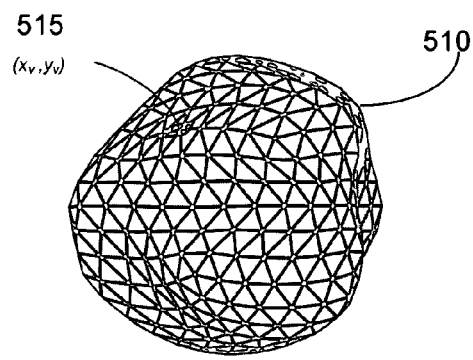

FIG. 5C shows an example of a target mesh 510 having vertex v 515 on which the synthesis process assigns a 2D texture coordinate (x$_v$, y$_v$).

Figure 5D:
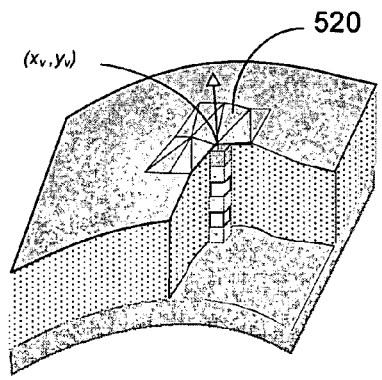

FIG. 5D shows the stack of voxels (x$_v$, y$_v$) in the texture domain being placed in the object shell below vertex v along the surface normal at v. That is, the material shell 520 is then obtained by placing n$_z$ voxels $\{(x_v, y_v, z_1), \ldots, (x_v, y_v, z_{nz})\}$ along the surface normal at every vertex v. The material shell represented this way is a dense set of points on an irregular grid. To facilitate the subsequent rendering operations, these points are re-sampled onto a regular grid.

Figure 6A:
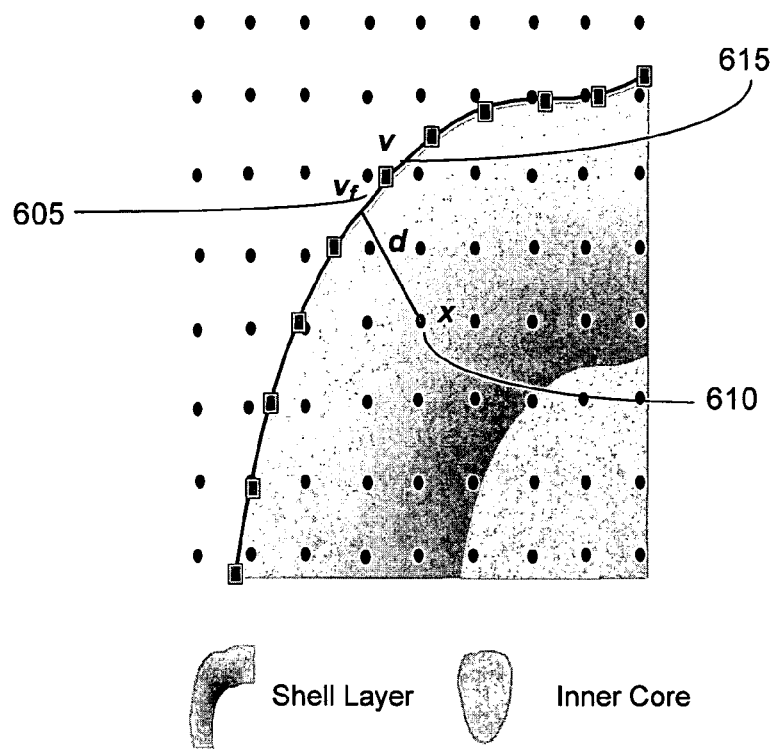
FIG. 6A-6B show different perspectives of a shell for illustrating shell re-sampling, according to an example embodiment.
Figure 6B:
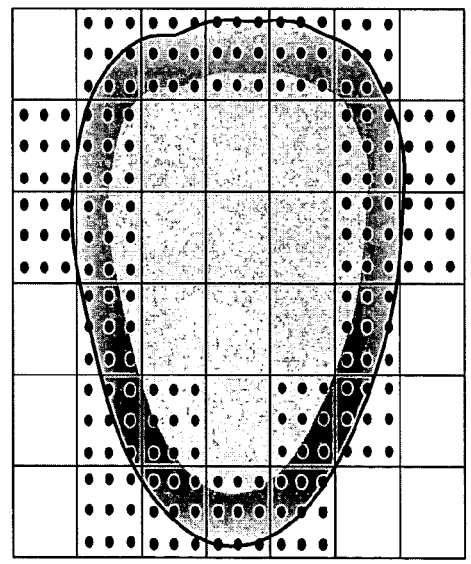

FIGS. 6A and 6B provide different perspectives of a shell for illustrating shell re-sampling. More particularly, a distance field d of the target surface mesh is generated on a regular grid, with the grid interval d being equal to the voxel size of the base volume V$_b$. As shown in FIG. 6A, for each sampling point x on the regular grid, the nearest point v$_f$ 605 on the mesh and the distance d between v$_f$ 605 and x 610. The texture coordinate of x 610 is (t$_u$, t$_v$, d/d$_0$), where (t$_u$, t$_v$) is the texture coordinate of the mesh vertex v 615 nearest to vf 605. Using the texture coordinate of the nearest vertex avoids interpolation calculations and provides a close approximation since, for synthesis-purposes, the mesh is densely re-tiled such that each voxel corresponds to a vertex on the surface.

The material shell occupies only the space near the target surface mesh, and therefore even multiple sampling points of the regular grid have no significant impact on data storage requirements. Accordingly, space efficiency may be achieved by using hierarchical spatial data structures such as octrees and k-d trees, which are data structures known in the field of computer graphics and therefore are not described herein.

FIG. 6B shows a two-level storage structure for shell voxels. More particularly, implementation of the example embodiment utilizes the simple two-level data structure of FIG. 6B. The (bottom-level) leaf nodes correspond to the sampling points of the regular grid and store data for the subsurface layer. A top-level node contains 8×8×8 leaf nodes. Space efficiency is achieved by setting top-level nodes to null in areas not occupied by the material shell.

For a sampling point x in the material shell with texture coordinate (t$_u$, t$_v$, d/d$_0$), the corresponding material properties are those of the corresponding point x'=(t$_u$, t$_v$, d/d$_0$) in the base volume. Further, the single- and multiple-scattering STF values at x' are utilized as those at x. That is, in synthesis of the material shell, each point x has a volume neighborhood N$_x$, whose material properties are similar to that of the volume neighborhood N$_{x'}$ around point x' in the base volume V$_\omega$. For an optically thick medium and a given light direction, the multiple-scattering irradiance contribution to a point is determined by the material properties of a sufficiently large volume neighborhood around the point, and contributions from areas outside this neighborhood may be negligible by comparison. For single scattering, photons from outside the neighborhood may bring irradiance to a voxel, but such photons are so few that their irradiance contribution may be safely ignored.

The validity of STF values assigned to shell voxels may be contingent on the neighborhoods N$_x$, N$_{x'}$, being large enough to contain the voxels that affect the irradiance of x, x'. The range over which voxels affect each other is dependent on the material properties. As set forth previously, this range may be expressed as twice the diffuse mean free path of the material. This neighborhood size is included as a parameter in the texture synthesis algorithm to ensure that an appropriate range of neighborhood similarity is used.

The similarity of neighborhoods N$_x$, N$_x$ can also be affected by curvature in the shell, which warps the configuration of N$_x$. In the embodiments described herein, it may be assumed that the size of N$_x$ is small relative to variations in mesh shape, such that N$_x$ is substantially flat. To roughly handle instances where this assumption does not hold, the STF could potentially be extended to include a single curvature parameter without requiring an impractical amount of storage.

The rendering of an object shown by block 320 of FIG. 3 is described hereafter. That is, an object can be rendered efficiently by ray tracing by representing the object by an STF-based shell and a homogeneous inner core. More particularly, the corresponding radiance calculation involves at least the following steps. First, an illumination that enters the homogeneous core may be obtained as the irradiances at the bottom layer of shell voxels, calculated by multiplying the light intensity with the bottom layer STF values. Then, from the light entering the core, the dipole approximation may be employed to compute the light exiting the homogeneous core. Next, the light incident upon the object and the light exiting the inner core may be used to determine the irradiances of the shell voxels using the STF. From these irradiance values, the exiting radiance at the mesostructure surface is calculated by ray marching into the object interior.

Figure 7:
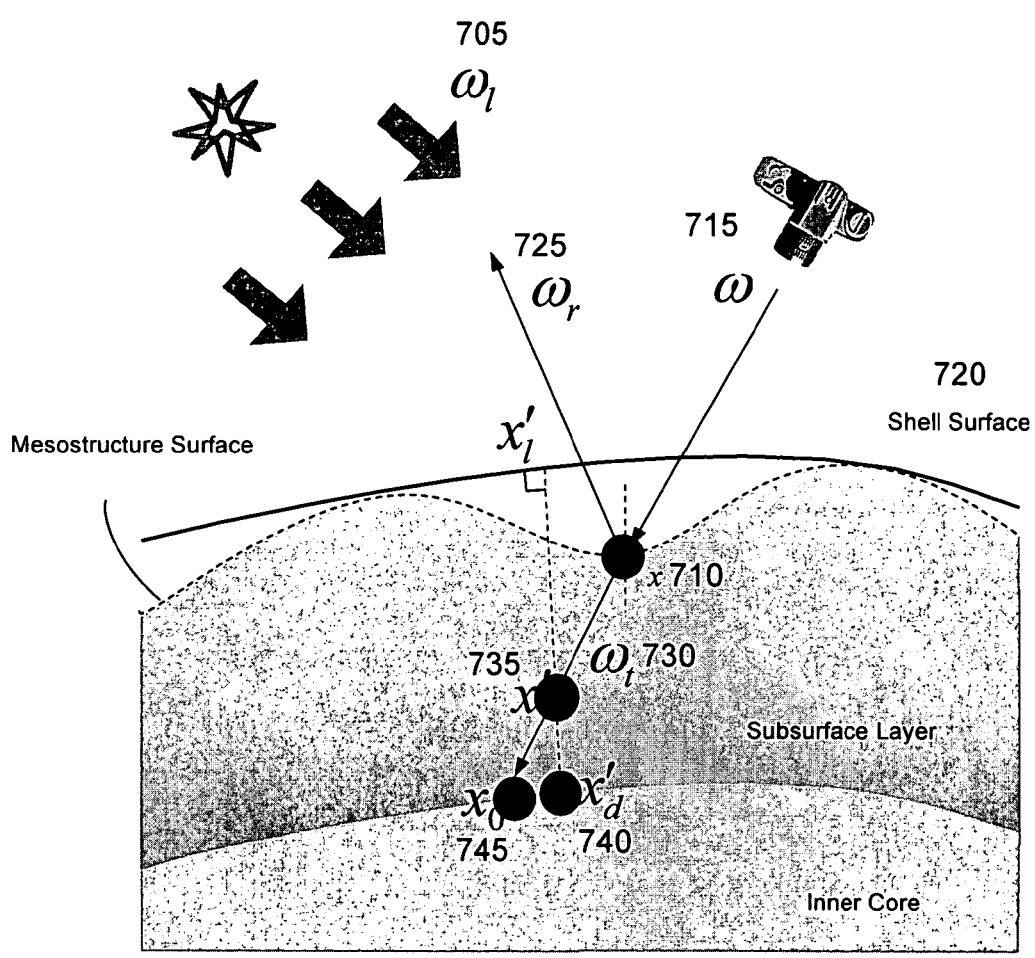
FIG. 7 illustrates the geometry of radiance evaluation, as utilized by an example embodiment.

FIG. 7 illustrates the geometry of radiance evaluation for a point or directional light source with local light direction ω$_l$ 705. The radiance L(x, ω) of surface voxel x 710 towards viewing direction ω 715 is composed of radiance reflected off the object surface 720, L$_R$, and radiance exiting the object volume L$_T$:

$$L(x,\omega)=(1-F_t)L_R(x,\omega_r)+F_tL_t(x,\omega_t)$$

where F$_t$ is the Fresnel transmittance, which is a well known optical phenomena, ω$_r$ 715 is the mirror direction of ω across the mesostructure surface normal at x, and ω$_t$ 730 is the refracted ray direction with respect to ω 715. The value of L$_R$(x, ω$_r$) may be evaluated by conventional ray tracing, recursively spawning rays. Because of the recursive spawning, inter-reflections over the mesostructure surface are included in L$_R$(x, ω$_r$).

To evaluate the refracted ray radiance $L_R(x, \omega_t)$, an integration along the refraction ray into the object interior is made according to the equation:

$$\int_{x_0}^{x} \sigma_s(x') e^{-\int_{x'}^{x} \kappa(\xi) d\xi} I_b(x', \omega_t) dx',$$

where $I_b(x', \omega_t)$ is the irradiance of voxel x' 735 that contributes to radiance in direction $\omega_t$. The irradiance distribution $I_b(x', \omega_t)$ is computed from the local light source intensity $I_0(x'_l, \omega_t)$ on the shell surface, the homogeneous core radiance $L_d(x, \omega_l)$, and the single- and multiple-scattering STF values as follows:

$$\frac{1}{4\pi} I_0(x'_l, \omega_l) I_m(x', \omega_l) +$$

$$\frac{1}{4\pi} L_d(x'_d, \omega_l) I_m(x', \omega_b) + f(x', \omega_l, \omega_t) I_0(x', \omega_l) I_s(x', \omega_l)$$

The first term of this expression is the multiple-scattering STF value scaled by the illumination $I_0$ arriving at the top of the object shell. The second term accounts for the contribution of inner core radiance $L_d(x'_d, \omega_l)$ from point $x'_d$ 740 the projection of x' 735 in the shell normal direction onto the inner core. The value of $L_d(x'_d, \omega_l)$ is obtained from the dipole calculation, and its contributions to shell voxel irradiances are scaled by the multiple-scattering STF values $I_m(x', \omega_b)$ for backlight direction $\omega_b$. The first two terms of $I_b(x', \omega_t)$ together account for the isotropic multiple scattering contribution from voxels within the object shell. The third term of $L_d(x'_d, \omega_l)$ is the single scattering contribution from within the shell that is reflected in direction $\omega_t$. The single scattering contribution of the homogeneous inner core is not included because of the negligible likelihood of a photon traversing the subsurface layer without being scattered or absorbed.

For each sample point x, $I_s(x, \omega_l)$ and $I_m(x, \omega_l)$ are obtained by tri-linearly interpolating the corresponding single and multiple STF values of the eight surrounding voxels. Material properties needed for evaluating $L_r(x, \omega_t)$ are also obtained by trilinear interpolation.

Figure 8:
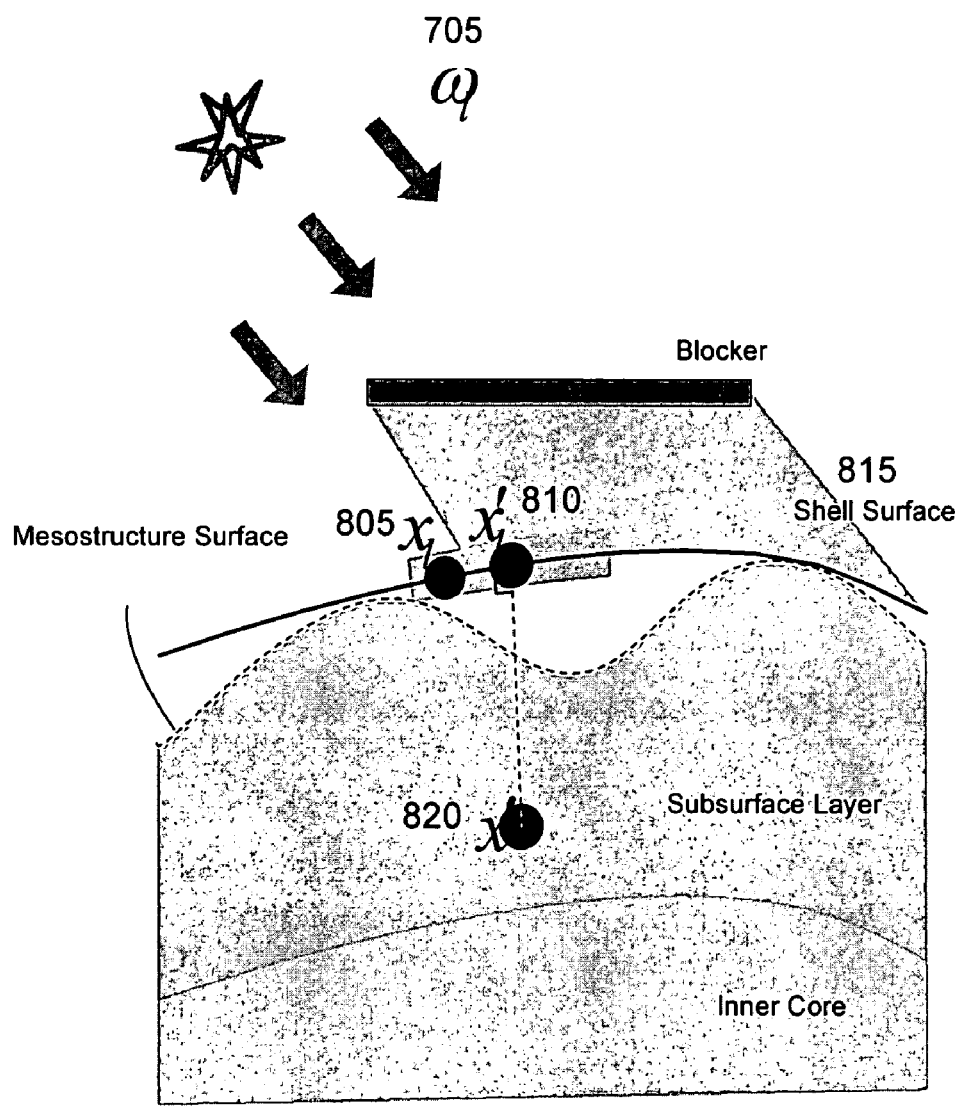
FIG. 8 illustrates usage of an irradiance correction at the shadow boundary, in accordance with an example embodiment.

FIG. 8 is provided to illustrate how, when illumination onto a shell surface is not locally uniform, an irradiance correction kernel may propogate shadow/light into the subsurface layer to account for lighting differences. That is, since the STF values $I_m(x', \omega_l)$ and $I_s(x', \omega_l)$ are precomputed with uniform directional illumination over the material sample, the calculation of irradiance distribution $I_b(x, \omega_t)$ for a shell voxel is valid when the illumination is uniform over the surface neighborhood around $x'_l$ 810, with the projection of x' 805 onto the shell surface being along the shell normal direction. Unlike mesostructure shadows, an external geometry shadow is not modeled in the STF. For shell voxels near the shadow boundaries cast by external geometry, an irradiance correction technique may be utilized to improve the accuracy of irradiance calculation.

For instance, where x' 805 is in a shadow near a shadow boundary, $I_b(x, \omega_t)$ may be calculated based on the assumption that all shell surface voxels near $x'_l$ 810 have a same illumination $I_0(x'_l, \omega_l)$. For a shell surface voxel $x_1$ 805 that is near $x'_l$ 810 but not in a shadow, the difference between assumed and actual illumination at $x_l$, $\Delta I_0(x_l, \omega_l) = I_0(x_l, \omega_l) - I_0(x'_l, \omega_l)$, may be significant due to an abrupt change of illumination across a shadow boundary, and the calculation of irradiance $I_b(x, \omega_t)$ requires correction. This extra illumination $\Delta I_0(x_l, \omega_l)$ may diffuse across shadow boundaries.

To compute the correction term of $I_b(x, \omega_t)$, numerous photons may be emitted into the object shell 815 from $x_1$ 805 in all directions, and then calculate the multiple-scattering irradiance contribution of these photons to the voxel as $$\hat{I}_m(x', x_l) = \frac{1}{4\pi} \frac{\sum_m \Delta \Phi_p(x', \omega_p)}{\sigma_s(x') \Delta V},$$

which is evaluated the same way as the multiple-scattering STF value $I_m(x, \omega_l)$. The correction to $I_b(x, \omega_t)$ due to $x_l$ is thus $\hat{I}_m(x', x_l) \Delta I_0(x_l, \omega_l)$. The total correction to $I_b(x, \omega_t)$ includes the individual correction term of each $x_1$ that is in the neighborhood of x' but not in shadow. The neighborhood dimension may be set to twice the diffuse mean free path. For the case where $x_l$ is near a shadow boundary but not in a shadow, the correction term is computed identically, because the correction is negative when $\Delta I_0(x_l, \omega_l)$ is negative.

For a given shell surface voxel $x_1$, $\hat{I}_m(x', x_l)$ may be referred to as the irradiance correction kernel (ICK) and represented as a function defined on a 3D array of voxels, which may be called the domain of the ICK. Because the object shell is synthesized from the STF base volume $V_b$, the ICK may be precomputed with $V_b$ and then applied to the object shell during rendering. Since $V_b$ is non-homogeneous, ICK is pre-computed for each shell surface voxel of $V_b$. To reduce the number of different ICK values, the shell surface voxels may be clustered using the K-means algorithm according to material properties in their ICK domains. A single ICK may then be computed and stored for each cluster. The similarity measure for ICK domains is the same as the neighborhood similarity used in shell synthesis.

While higher precision in irradiance correction may be obtained with a larger number of ICK values, for the example embodiments described herein, one ICK value is computed by tracing 1000 photons in a homogeneous array. This simplified model typically gives a reasonable irradiance correction.

Figure 9:
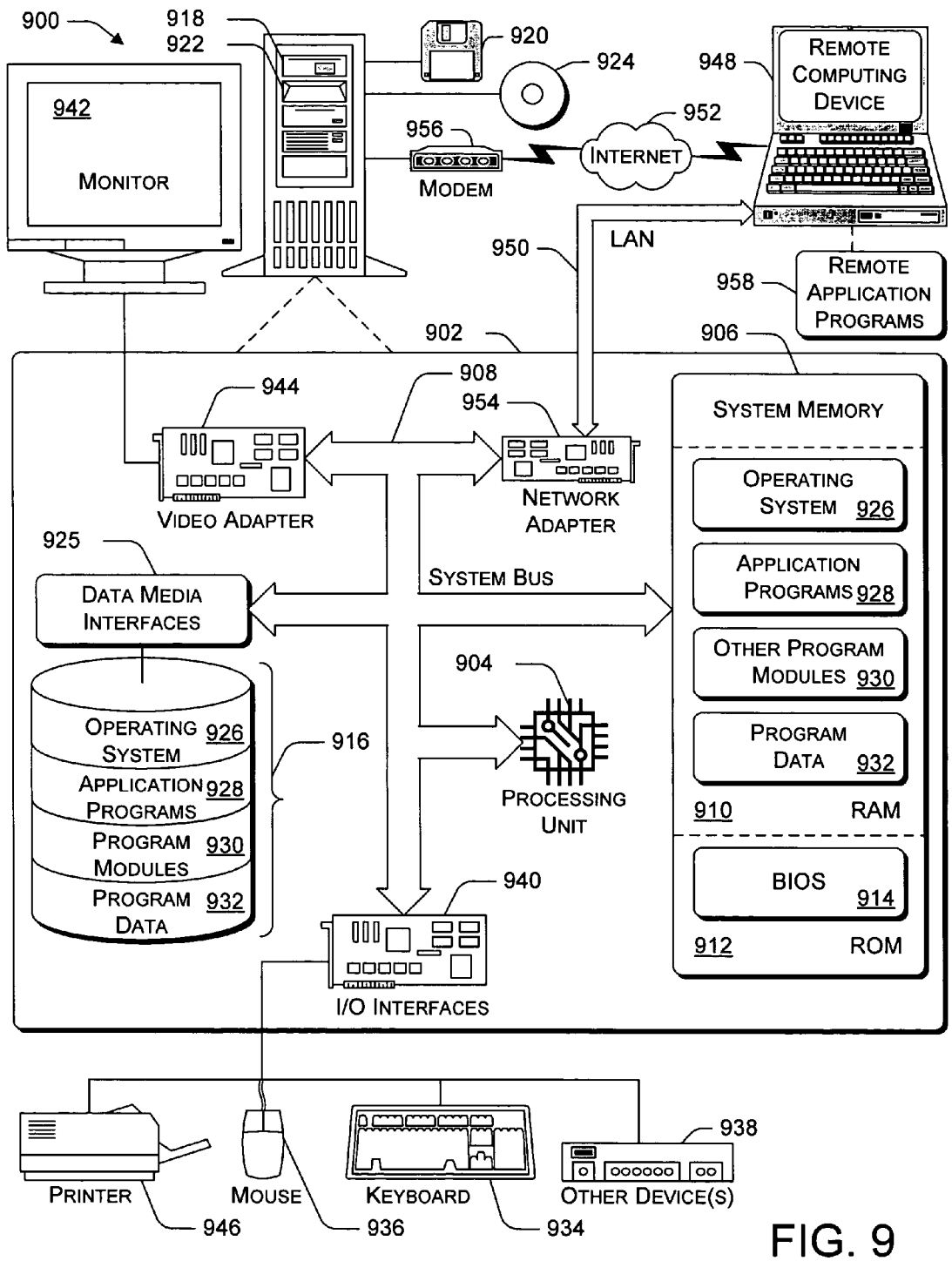
FIG. 9 illustrates an example of a general computer network environment which can be used to implement the techniques described herein.

By the above-description, example embodiments for STF modeling and rendering system are shown to include at least the following components: one for modeling the STF base volume $V_b$, one for generating a STF sample from $V_b$, using photon tracing, one for synthesizing the STF sample onto a surface, and one for rendering the final STF-based model. User intervention merely calls for modeling a small piece of the material sample. Once the STF sample is obtained, the synthesis and rendering steps follow known surface texturing pipeline implementations FIG. 9 illustrates a general computer environment 900, which can be used to implement the techniques described herein. The computer environment 900 is only one example of a computing environment and is not intended to suggest any limitation as to the scope of use or functionality of the computer and network architectures. Neither should the computer environment 900 be interpreted as having any dependency or requirement relating to any one or combination of components illustrated in the example computer environment 900.

Computer environment 900 includes a general-purpose computing device in the form of a computer 902, which may include, but is not limited to computing device 105 shown in FIG. 1. The components of computer 902 can include, but are not limited to, one or more processors or processing units 904, system memory 906, and system bus 908 that couples various system components including processor 904 to system memory 906.

System bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 902 may include a variety of computer readable media. Such media can be any available media that is accessible by computer 902 and includes both volatile and non-volatile media, removable and non-removable media.

System memory 906 includes computer readable media in the form of volatile memory, such as random access memory (RAM) 910; and/or non-volatile memory, such as read only memory (ROM) 912 or flash RAM. Basic input/output system (BIOS) 914, containing the basic routines that help to transfer information between elements within computer 902, such as during start-up, is stored in ROM 912 or flash RAM. RAM 910 typically contains data and/or program modules that are immediately accessible to and/or presently operated on by processing unit 904.

Computer 902 may also include other removable/non-removable, volatile/non-volatile computer storage media. By way of example, FIG. 9 illustrates hard disk drive 916 for reading from and writing to a non-removable, non-volatile magnetic media (not shown), magnetic disk drive 918 for reading from and writing to removable, non-volatile magnetic disk 920 (e.g., a "floppy disk"), and optical disk drive 922 for reading from and/or writing to a removable, non-volatile optical disk 924 such as a CD-ROM, DVD-ROM, or other optical media. Hard disk drive 916, magnetic disk drive 918, and optical disk drive 922 are each connected to system bus 908 by one or more data media interfaces 925. Alternatively, hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, removable magnetic disk 920, and removable optical disk 924, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 916, magnetic disk 920, optical disk 924, ROM 912, and/or RAM 910, including by way of example, operating system 926, one or more application programs 928, other program modules 930, and program data 932. Each of such operating system 926, one or more application programs 928, other program modules 930, and program data 932 (or some combination thereof) may implement all or part of the resident components that support the distributed file system.

A user can enter commands and information into computer 902 via input devices such as keyboard 934 and a pointing device 936 (e.g., a "mouse"). Other input devices 938 (not shown specifically) may include a microphone, joystick, game pad, satellite dish, serial port, scanner, and/or the like. These and other input devices are connected to processing unit 904 via input/output interfaces 940 that are coupled to system bus 908, but may be connected by other interface and bus structures, such as a parallel port, game port, or a universal serial bus (USB).

Monitor 942 or other type of display device can also be connected to the system bus 908 via an interface, such as video adapter 944. In addition to monitor 942, other output peripheral devices can include components such as speakers (not shown) and printer 946 which can be connected to computer 902 via I/O interfaces 940.

Computer 902 can operate in a networked environment using logical connections to one or more remote computers, such as remote computing device 948. By way of example, remote computing device 948 can be a PC, portable computer, a server, a router, a network computer, a peer device or other common network node, and the like. Remote computing device 948 is illustrated as a portable computer that can include many or all of the elements and features described herein relative to computer 902. Alternatively, computer 902 can operate in a non-networked environment as well.

Logical connections between computer 902 and remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, computer 902 is connected to local network 950 via network interface or adapter 954. When implemented in a WAN networking environment, computer 902 typically includes modem 956 or other means for establishing communications over wide network 952. Modem 956, which can be internal or external to computer 902, can be connected to system bus 908 via I/O interfaces 940 or other appropriate mechanisms. It is to be appreciated that the illustrated network connections are examples and that other means of establishing at least one communication link between computers 902 and 948 can be employed.

In a networked environment, such as that illustrated with computing environment 900, program modules depicted relative to computer 902, or portions thereof, may be stored in a remote memory storage device. By way of example, remote application programs 958 reside on a memory device of remote computer 948. For purposes of illustration, applications or programs and other executable program components such as the operating system are illustrated herein as discrete blocks, although it is recognized that such programs and components reside at various times in different storage components of computing device 902, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A method, comprising:
   acquiring material parameters for each voxel of a material sample, the material parameters including at least one of an extinction coefficient, a fraction of surface reflected incident radiation, and a scattering coefficient;
   determining irradiance distribution values for the material sample based on at least one of the material parameters;
   synthesizing the material sample onto a mesh of an object based on at least one of the material parameters; and
   rendering the object utilizing the determined irradiance distribution values of the material sample synthesized onto the mesh of the object, wherein rendering the object includes ray tracing by representing the object by a base volume and a homogeneous inner core.

2. A method according to claim 1, wherein acquiring material parameters for a material sample includes using volume modeling and processing techniques for volume visualization.

3. A method according to claim 1, wherein acquiring material parameters for a material sample includes using computed tomography (CT) or scan-converting techniques on 3-D geometry models.

4. A method according to claim 1, wherein acquiring material parameters for a material sample includes determining scattering properties of a surface object according to a dipole diffusion approximation.

5. A method according to claim 1, wherein the material sample includes at least one voxel in a volumetric material sample.

6. A method according to claim 1, wherein the determined irradiance distribution values for the material sample include a single-scattering irradiance value and a multiple-scattering irradiance value.

7. A method according to claim 1, wherein the irradiance distribution values for the material sample are determined utilizing a photon mapping technique.

8. A method according to claim 1, wherein the irradiance distribution values for the material sample are determined for each voxel in the material sample from one or more lighting and viewing directions.

9. A method according to claim 1, wherein synthesizing the material sample onto a mesh of an object includes assigning each point on the mesh of the object with a texture coordinate in a base volume of the material sample.

10. A method according to claim 1, wherein rendering the object includes:
    obtaining an illumination that enters a core of the object as irradiances that are calculated by multiplying light intensity with irradiance distribution values from a bottom portion of the object;
    computing a light exiting the core of the object using a dipole approximation;
    determining the irradiances of voxels on a shell of the object using light incident upon the object and the light exiting the core of the object; and
    calculating an exiting radiance at a mesostructure surface by ray marching into the interior of the object.

11. A computer-readable medium having one or more instructions that are executable by one or more processors, the one or more instructions causing the one or more processors to:
    generate a base volume of a material sample;
    computing a single-scattering irradiance value and a multiple-scattering irradiance value for each voxel of the material sample;
    synthesize the base volume onto a target mesh, wherein each point on the target mesh is assigned a texture coordinate in the base volume; and
    render the object by ray tracing onto the mesh.

12. A computer-readable medium according to claim 11, wherein voxels of the base volume lie in either a subsurface layer or a surrounding free space of the material sample.

13. A computer-readable medium according to claim 11, wherein the single-scattering irradiance value comprises a radiance component from a light source and the multiple-scattering irradiance value comprises a radiance component from other voxels.

14. A computer-readable medium according to claim 12, wherein the single-scattering irradiance value $I_s$ and the multiple-scattering irradiance value $I_m$ for a position x in the base volume a light-source direction $\omega_l$ are computed as, respectively:

$$I_s(x, \omega_l) = \frac{\sum_s \Delta\Phi_p(x, \omega_l)}{\sigma_s(x)\Delta V}, \quad I_m(x, \omega_l) = \frac{\sum_m \Delta\Phi_p(x, \omega_p)}{\sigma_s(x)\Delta V}$$

where the radiance is summed over the n photons inside a differential volume $\Delta V$, and $\Delta\Phi_p(x, \omega_p)$ is the flux carried by a photon from incoming direction $\omega_p$.

15. A computer-readable medium according to claim 11, wherein the single-scattering irradiance values and the multiple-scattering irradiance values are computed as a function of, at least, a position in the base volume of the sample material and a light source direction.

16. A computer-readable medium according to claim 11, wherein synthesizing the base volume onto a target mesh includes, for each mesh vertex, assigning a texture coordinate and placing the base volume below a surface of the mesh along a surface normal at the vertex.

17. A method, comprising:
acquiring material parameters for each voxel of a material sample, the material parameters including at least one of an extinction coefficient, a fraction of surface reflected incident radiation, and a scattering coefficient;
synthesizing a material sample onto a mesh of an object, wherein irradiance distribution values for the material sample are determined based on the acquired parameters; and
rendering the object utilizing the determined irradiance distribution values of the material sample synthesized onto the mesh of the object, wherein rendering the object includes:
obtaining an illumination that enters a core of the object as irradiances that are calculated by multiplying light intensity with irradiance distribution values from a bottom portion of the object;
computing a light exiting the core of the object using a dipole approximation;
determining the irradiances of voxels on a shell of the object using light incident upon the object and the light exiting the core of the object; and
calculating an exiting radiance at a mesostructure surface by ray marching into the interior of the object.

18. A method according to claim 17, wherein the material sample includes at least one voxel in a volumetric material sample.

19. A method according to claim 17, wherein the determined irradiance distribution values for the material sample include a single-scattering irradiance value and a multiple-scattering irradiance value.

20. A method according to claim 17, wherein the irradiance distribution values for the material sample are determined utilizing a photon mapping technique.

21. A method according to claim 17, wherein the irradiance distribution values for the material sample are determined for each voxel in the material sample from one or more lighting and viewing directions.

22. A method according to claim 17, wherein synthesizing the material sample onto a mesh of an object includes assigning each point on the mesh of the object with a texture coordinate in a base volume of the material sample.

23. A method according to claim 17, wherein rendering the object includes ray tracing by representing the object by a base volume and a homogeneous inner core.

24. A system for modeling an object, comprising:
means for acquiring texture sample parameters;
means for determining irradiance values of the texture sample;
means for synthesizing the texture sample over an object surface; and
means for rendering the object based on the synthesized object, wherein the means for rendering is configured to render the object via ray tracing by representing the object by a base volume and a homogeneous inner core.

25. A system according to claim 24, wherein the texture sample parameters are included in a base volume of the texture sample.

26. A system according to claim 24, wherein the means for determining irradiance values includes means for determining a single-scattering irradiance value and a multiple-scattering irradiance value for a position x in a base volume of the texture sample and for a light-source direction $\omega$.

27. A system for modeling an object, comprising:
means for acquiring texture sample parameters;
means for determining irradiance values of the texture sample;
means for synthesizing the texture sample over an object surface; and
means for rendering the object based on the synthesized object, wherein the means for rendering the object includes:
means for obtaining an illumination that enters a core of the object as irradiances, wherein the means is configured to calculate the irradiances by multiplying light intensity with irradiance distribution values from a bottom portion of the object;
means for computing a light exiting the core of the object using a dipole approximation;
means for determining the irradiances of voxels on a shell of the object using light incident upon the object and the light exiting the core of the object; and
means for calculating an exiting radiance at a mesostructure surface by ray marching into the interior of the object.

28. A system according to claim 27, wherein the texture sample parameters are included in a base volume of the texture sample.

29. A system according to claim 27, wherein the means for determining irradiance values includes means for determining a single-scattering irradiance value and a multiple-scattering irradiance value for a position x in a base volume of the texture sample and for a light-source direction $\omega$.

* * * * *